United States Patent
Gupta et al.

(10) Patent No.: US 9,424,653 B2
(45) Date of Patent: Aug. 23, 2016

(54) METHOD AND APPARATUS FOR IDENTIFYING A REPRESENTATIVE AREA OF AN IMAGE

(71) Applicant: Adobe Systems Incorporated, San Jose, CA (US)

(72) Inventors: Mohit Gupta, Kangra (IN); Durga Ganesh Grandhi, Vizianagaram (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 84 days.

(21) Appl. No.: 14/264,602

(22) Filed: Apr. 29, 2014

(65) Prior Publication Data

US 2015/0310585 A1    Oct. 29, 2015

(51) Int. Cl.
  G06K 9/00    (2006.01)
  G06T 7/00    (2006.01)
  G06T 3/00    (2006.01)
  G06K 9/32    (2006.01)

(52) U.S. Cl.
  CPC ......... G06T 7/0085 (2013.01); G06T 3/0025 (2013.01); G06T 7/0081 (2013.01); G06K 9/00228 (2013.01); G06K 9/3233 (2013.01); G06T 2207/20132 (2013.01); G06T 2210/22 (2013.01)

(58) Field of Classification Search
  None
  See application file for complete search history.

(56) References Cited

U.S. PATENT DOCUMENTS

| | | | |
|---|---|---|---|
| 5,978,519 A * | 11/1999 | Bollman | G06T 7/004 382/270 |
| 8,363,984 B1 * | 1/2013 | Goldman | G06T 3/0012 382/298 |
| 9,070,182 B1 * | 6/2015 | Chua | G06T 3/0012 |
| 2005/0188326 A1 * | 8/2005 | Ikeda | G06T 11/60 715/788 |
| 2006/0064716 A1 * | 3/2006 | Sull | G06F 17/30793 725/37 |
| 2007/0279696 A1 * | 12/2007 | Matsuzaka | G06K 15/02 358/3.26 |
| 2008/0013787 A1 * | 1/2008 | Kobayashi | G06K 9/00255 382/103 |
| 2008/0134094 A1 * | 6/2008 | Samadani | G06T 3/0012 715/838 |
| 2009/0319897 A1 * | 12/2009 | Kotler | G06T 11/60 715/711 |
| 2010/0128986 A1 * | 5/2010 | Xu | G06K 9/3208 382/190 |
| 2010/0158409 A1 * | 6/2010 | Sundareson | G06K 9/3233 382/282 |
| 2010/0195916 A1 * | 8/2010 | Blondiaux | G06K 19/086 382/209 |
| 2010/0199227 A1 * | 8/2010 | Xiao | G06F 3/0481 715/863 |

(Continued)

OTHER PUBLICATIONS

Bongwon Suh et al., "Automatic Thumbnail Cropping and its Effectiveness", downloaded on Apr. 29, 2014 from http://drum.lib.umd.edu/bitstream/1903/1279/1/CS-TR-4469.pdf, 10 pgs.

*Primary Examiner* — Aaron W Carter
(74) *Attorney, Agent, or Firm* — Keller Jolley Preece

(57) ABSTRACT

A computer implemented method for generating a representative thumbnail for an image. The method comprises determining a representative area of an image, the determining comprising determining an absence of faces in the image; dividing the image into one or more zones; and selecting a zone with maximum edge strength as the representative area; and generating a thumbnail by cropping the image to the representative area.

20 Claims, 6 Drawing Sheets

(56) References Cited

U.S. PATENT DOCUMENTS

| | | | |
|---|---|---|---|
| 2010/0266208 A1* | 10/2010 | Downing | H04N 1/3872 382/195 |
| 2011/0087998 A1* | 4/2011 | Samadani | G06T 3/0012 715/838 |
| 2012/0246565 A1* | 9/2012 | Kumamoto | G06F 8/38 715/273 |
| 2013/0022244 A1* | 1/2013 | Nagata | G06F 17/30256 382/103 |
| 2013/0108119 A1* | 5/2013 | Ptucha | G06F 1/30247 382/110 |
| 2013/0108122 A1* | 5/2013 | Ptucha | G06T 11/00 382/118 |
| 2013/0108157 A1* | 5/2013 | Ptucha | H04N 1/3873 382/173 |
| 2013/0108164 A1* | 5/2013 | Ptucha | G06K 9/00228 382/195 |
| 2013/0108165 A1* | 5/2013 | Ptucha | G06T 11/60 382/195 |
| 2013/0108166 A1* | 5/2013 | Ptucha | G06T 11/60 385/195 |
| 2013/0108167 A1* | 5/2013 | Ptucha | G06T 11/00 382/195 |
| 2013/0108168 A1* | 5/2013 | Ptucha | G06F 17/30259 382/195 |
| 2013/0108169 A1* | 5/2013 | Ptucha | G06K 9/00228 382/195 |
| 2013/0108170 A1* | 5/2013 | Ptucha | G06K 9/00228 382/195 |
| 2013/0108171 A1* | 5/2013 | Ptucha | H04N 1/3873 382/195 |
| 2013/0108175 A1* | 5/2013 | Ptucha | G06T 11/60 382/199 |
| 2014/0270533 A1* | 9/2014 | Chedeau | G06K 9/3233 382/195 |
| 2014/0321770 A1* | 10/2014 | Potdar | G06T 11/60 382/282 |
| 2015/0017598 A1* | 1/2015 | Wu | A61C 9/006 433/29 |
| 2015/0106765 A1* | 4/2015 | Lee | G06F 3/0487 715/810 |
| 2015/0262333 A1* | 9/2015 | Chua | G06T 3/40 382/199 |

* cited by examiner

METHOD AND APPARATUS FOR IDENTIFYING A REPRESENTATIVE AREA OF AN IMAGE

BACKGROUND

1. Field of the Invention

Embodiments of the present invention generally relate to image viewing and, more particularly, to a method and apparatus for identifying a representative area for an image.

2. Description of the Related Art

Images, such as digital photographs, can be taken in different sizes and in different aspect ratios (such as landscape, portrait, 6×4 inches, 7×5 inches, etc.). In a collection of images, there are often a combination of images with different sizes and aspect ratios mixed together. When displaying thumbnail images of the collection in a grid created by photo organization software tools, display space is wasted or images are cropped to generate uniformly sized thumbnails such as squares. Display space tends to be wasted because the photo organization tools resize irregularly sized images to fit into a pre-allocated grid space with a different aspect ratio than the resized images. Additionally, cropped thumbnail images tend to be "center" cropped, often resulting in an inaccurate representation of the original image.

Therefore, there is a need for a method and apparatus for identifying a representative area for an image.

SUMMARY

A method for identifying a representative area of an image. The method comprises determining a representative area of an image. Upon determining an absence of faces in the image, the image is divided into zones. The zone with maximum edge strength is selected as the representative area. A thumbnail is generated by cropping the image to the representative area.

In another embodiment, an apparatus for identifying a representative area of an image is described. The apparatus comprises a computer having one or more processors for executing instructions comprising a face detection module configured to detect that a scaled image includes one or more faces, and determine a priority for each of the one or more faces. The apparatus also includes an image processing module configured to select a representative area that includes the one or more faces, when the priority of each of the one or more faces is greater than a predefined threshold. The image processing module then generates a thumbnail by cropping the image to the representative area.

In yet another embodiment, a non-transient computer readable medium for storing computer instructions that, when executed by at least one processor causes the at least one processor to perform the method identifying a representative area for an image is described.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
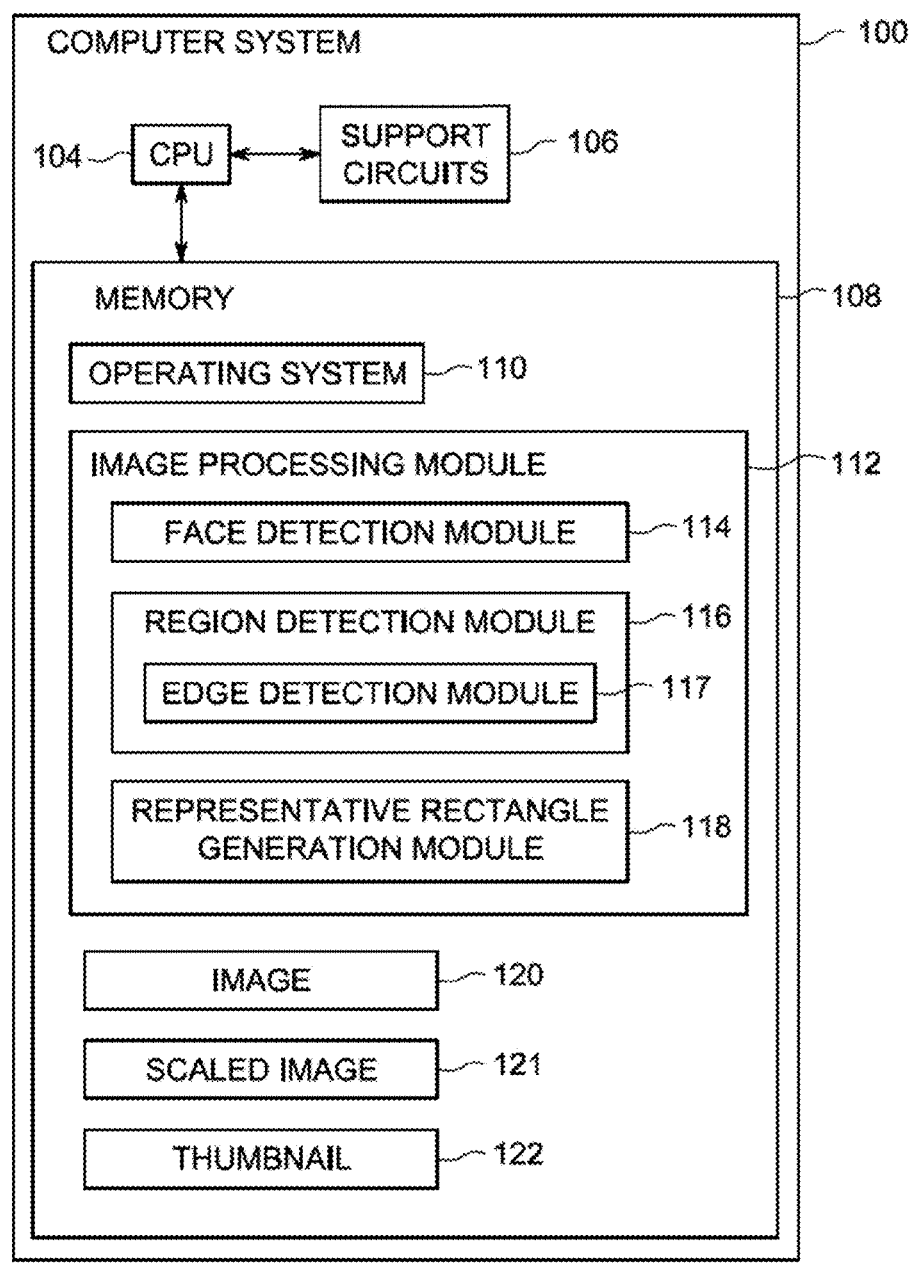
FIG. 1 is a block diagram of a system for identifying a representative area for an image, according to one or more embodiments.

While the method and apparatus is described herein by way of example for several embodiments and illustrative drawings, those skilled in the art will recognize that the method and apparatus for generating ordered user expert lists for a shared digital document is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for generating ordered user expert lists for a shared digital document defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for identifying a representative area for an image. An image, such as a photograph, is processed to generate a rectangle which best represents the image contents as a thumbnail image. In some embodiments, if one or more faces appear in the image, a rectangle which can fit around the most faces, or the most prominent and important faces, is selected as a representative area for the image. If no faces appear in the image, edge detection is performed on the image. The image is divided into one or more zones, and the zone that is determined to have the maximum edge strength is selected as the representative area. The image is cropped based on the representative area to generate a thumbnail image which represents the contents of the image. The thumbnail image is used to represent the image in a grid of images, e.g. in a photo gallery, so that a viewer of the grid can easily ascertain the importance of the image.

In another example, a set of filters may each apply individual effects to the photograph and an embodiment of the present invention improves the user's ability to see how the filter impacts the most important regions of the photograph and to subsequently select their favorite effect in light of the previewed result. In one instance, a grid of thumbnail images may be displayed, each thumbnail having a distinct filter applied to it. The representative area shown in the thumbnail is calculated as described above, while the application of the filter allows the user to preview the effect of the filter effect without applying it to an original image.

Advantageously, using the embodiments of the invention described herein, software applications such as ADOBE® PHOTOSHOP®, PHOTOSHOP ELEMENTS®, and the like provide meaningful representative thumbnails to users.

Various embodiments of a method and identifying a representative area for an image are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for identifying a representative area for an image, according to one or more embodiments. The apparatus 100 includes a computer 102. The computer 102 is a computing device, for example, a desktop computer, laptop, tablet computer, and the like. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, an image processing module 112, a face detection module 114, a region detection module 116 and a representative rectangle generation module (RRGM) 118. The region detection module 116 further includes an edge detection module 120. The operating system 110 may include various commercially known operating systems.

The image processing module 112 processes an image 120, e.g., a photograph taken by a digital camera, to produce a thumbnail representation 122 for the image 120. The image processing module 112 may process an entire gallery of images/photographs from a mobile device, laptop, desktop computer, or the like. According to one embodiment, the image processing module 112 scales the image 120 to a smaller scale image 121 (while maintaining an aspect ratio of image 120) before continuing with any further steps in order to reduce processing time and burden on the underlying hardware.

For an image where there are no faces present in the image, the image processing module 112 also subdivides the image 120 into a plurality of zones so that the processing module 112 may compare the zones to determine which zone is a best representative area of the image 120. A zone is a sub-region of the image 120. One or more zones may include the representative area of the image 120. (W,H) represents the width and height, in pixels, of the image 120. (W1,H1) represent the height and width of the thumbnail rectangle area. The scaling factors along the height and width are computed as: S1=H/H1 and S2=W/W1. If it is determined that S1 is equal to S2, the image 120 is scaled with either scaling factor to form the scaled image 121, and no zones need to be computed. In other words, if the aspect ratio of the image 120 is equal to the aspect ratio of the thumbnail rectangular area, then no zones are computed. Rather the image 120 is scaled to the size of the thumbnail rectangular area. The scaled image 121 is used as a thumbnail image. If, however, the aspect ratio of the image 120 is not equal to the aspect ratio of the thumbnail rectangular area, then zones are computed. According to one embodiment, if S1 is greater than S2, the image 120 is subdivided into zones, where for each zone, the width of the zone is greater than the height of the zone. Conversely, if S2 is greater than S1, the image 120 is subdivided into zones, where for each zone, the height of the zone is greater than the width of the zone.

In one embodiment, the scaled image is formed into overlapping zones with a width greater than a height if S1 is greater than S2. The zones are overlapped to produce representative areas which do not cut off important portions of objects in the image. For example, if the image 120 is 2000×1000 pixels and the thumbnail must be sized down to a 200×50 pixel window, the scaling factor for the height, S1 is determined as 1000 divided by 50, or 20. The scaling factor for the width, S2 is determined as 2000 divided by 200, or 10. Since S1 is greater than S2, the lower scaling factor S2 is used to determine the zones. In the present example, each zone has a height of S2×H1, or 10×50=500. Each zone has a width of S2×W1=10×200=2000.

In another embodiment, the scaled image 121 is formed into overlapping zones with a height greater than a width if S1 is less than S2. For example, given the same 2000×1000 pixel original image, but a thumbnail size of 100×100 pixels, S1 is determined as 1000 divided by 100, or 10, and S2 is determined as 2000 divided by 100, or 20. Because S1 is less than S2, the lower scaling factor S1 is used. Accordingly the zone will be formed as having a width equal to S1×W1=1000 and a height equal to S1×H1=1000. The RDM 116 divides the filtered image into vertical or horizontal zones.

In some instances, the image 121 contains one or more people, or may be a picture of scenery or other non-human objects. The face detection module 114 is invoked by the image processing module 112 to determine whether the image contains faces. If the face detection module 114 determines that one or more faces are found in the image, the faces are detected and marked. Those of ordinary skill in the art will recognize that standard face-detection methodologies are used herein. The face detection module 114 then distinguishes between each of the one or more faces detected by assigning a weight indicating an importance of each face. For example, if one face is larger than several other faces, the larger face is given a greater weight than the smaller faces. If several faces are blurred and one or two faces are more in focus, those one or two faces that are more in focus are given a greater weight. The greater weight indicates that if the image were to be cropped to form a thumbnail, those faces would be more important to show than smaller or more blurred faces.

The RRGM 118 generates a representative area, e.g. a rectangle, which includes a maximum number of faces, or, alternatively, the most important faces. In other embodiments, the maximum number of important faces may also be used as the basis for the generation of the representative area. In some embodiments, the RRGM module 118 can be configured with parameters that adjust a threshold of face weight to include in the generated representative area, such as focus area, or the like. For example, if the threshold of weight is set low, then more faces are included and the representative area may represent a larger portion of the original photograph/image. If the threshold of weight is set high, then less faces are included in the representative area, but those included faces are more important than occluded faces. In some embodiments, the RRGM 118 generates a representative area that covers the maximum number of faces. The number of faces to be covered may also be an adjustable parameter of the RRGM 118. In an instance where a photograph contains an equal number of faces on an extreme of the sides of the image, priority is given to larger faces over smaller faces.

If no faces are detected in the photograph, the image processing module 112 invokes the region detection module (RDM) 116. The RDM 116 determines whether the photograph contains foliage, structures, landscapes, or the like.

If no faces are detected in the image 121 and the RDM 116 determines that the photograph contains foliage, structures or the like, the scaled image 121 is converted to a gray scale image, e.g., an image where each color in the image 120 is represented in a range from black to white. The RDM 116 then filters the gray scale image. In some embodiments, the filter may be a low pass filter, such as a Gaussian filter. The filtering reduces noise which may otherwise be detected as edges in the grayscale image. Each zone in the filtered image is then processed by the edge detection module (EDM) 120 to detect edges (e.g., thresholds between objects, or the like) in the image. The EDM 120 employs an edge detection filter such as a Sobel edge detector, for example.

The detection of many edges in a zone indicates more activity in the particular zone. Generally, a zone where more edges are detected has a higher strength of edges. A zone where fewer edges are detected, such as a clear sky, a plain background, or an out-of-focus region, has a lower strength of edges. The RRGM 118 then generates a rectangle with the maximum edge strength as the representative area. The rectangle may include one or more zones according to an adjustable parameter in the RRGM 118. The image processing module 112 then crops the image 121 to the thumbnail representation 122 based on the representative area. In some embodiments, the representative area may have a width and height equal to each other, generating a representative square.

The image processing module 112 can then generate a uniform aspect ratio grid representation of non-uniform aspect ratio images. Each original photograph may be of different sizes and different aspect ratios, however the representative rectangle generation module (RRGM) 118 generates a rectangle of uniform size for each photograph. The resulting grid of thumbnail images shows the important regions of each image and no space is wasted, while outlining to a viewer the importance of each image.

Figure 2:
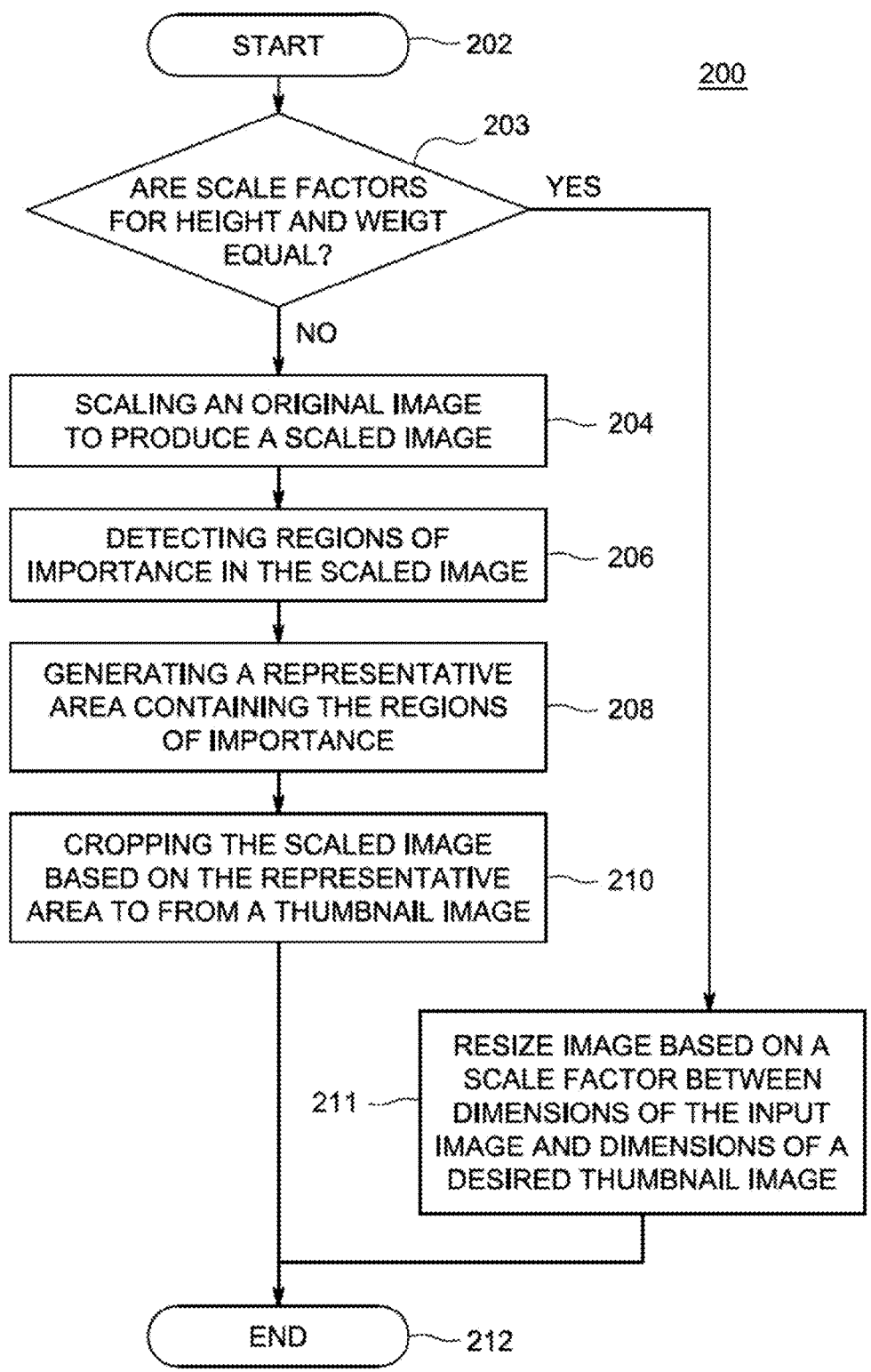
FIG. 2 depicts a flow diagram of a method for identifying a representative area for an image as performed by the image processing module of FIG. 1, according to one or more embodiments.

FIG. 2 depicts a flow diagram of a method 200 identifying a representative area for an image as performed by the image processing module 112 of FIG. 1, according to one or more embodiments. The method begins at step 202 and proceeds to step 203.

At step 203, the method 200 determines whether the scaling factor of the width (S1) and the scaling factor for the height (S2) between a detected image and the desired thumbnail image size are equal. If the scale factors S1 and S2 are equal, the method proceeds to step 211. At step 211, the image is resized based on the scale factor between dimensions of the detected image and dimensions of a desired thumbnail image. For example, if the thumbnail size is desired to be 100×50 pixels, a 1200×600 pixel image will be scaled down by a factor of 12 to a size of 100×50 pixels.

However, if, at step 203, the scale factors are not equal, the method proceeds to step 204. At step 204, the method 200 scales an image or photograph to produce a scaled image. This reduces processing time in the further steps of the method 200. For example, if an image is 4000×3000 pixels, the image may be reduced to 800×600 pixels, thereby reducing the number of pixels that the method is performed on, reducing processing time.

The method 200 then proceeds to step 206, where the method 200 detects the regions of importance in the scaled image. In some embodiments, regions of importance are determined by the faces detected in the image, as described in further detail with respect to FIG. 3 below. For example, if one area of an image contains many faces, the regions of importance are focused on that area. In other embodiments, a greater amount of activity determines where the regions of importance are, as described in further detail with respect to FIG. 4 below. In a photograph showing fireworks, the region of the photograph with the fireworks is determined to be a region of importance.

The method 200 proceeds to step 208. At step 208, the method 200 generates a representative area containing the regions of importance. As described above, for example, the representative area may contain all of the detected faces. In another example, the representative area may contain mountains, fireworks, vehicles, or the like.

The method 200 proceeds to step 210. At step 210, the method 200 crops the scaled image based on the representative area. As in the above example, the scaled image is 800×600 pixels and the method 200 determines that the representative area is a 600×600 pixels portion of the scaled image, starting from the top left of the image. Accordingly, the scaled image is cropped to the 600×600 pixels top-left portion, a thumbnail representing the important portion of the original 4000×3000 pixel image. Now, when this method 200 is applied across a set of images such as a gallery, or in a grid-view, a user is easily able to see all of the images and why those images were taken based on the important portions being shown. The method 200 proceeds to step 212 and ends.

Figure 3:
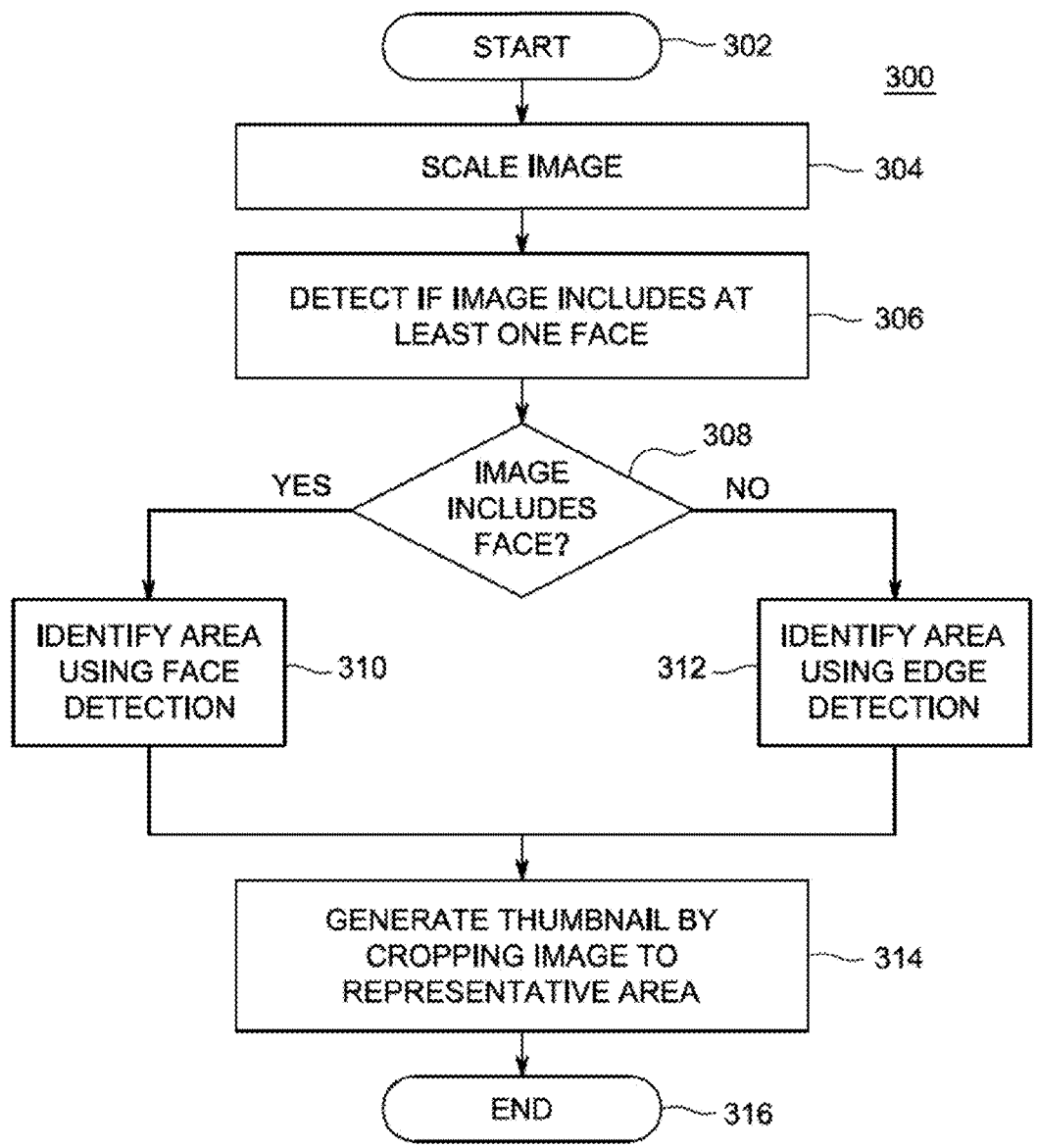
FIG. 3 depicts a flow diagram of a method for detecting regions of importance in the scaled image, as performed by the image processing module of FIG. 1, according to one or more embodiments.

FIG. 3 depicts a flow diagram of a method 300 for detecting regions of importance in the scaled image, as performed by the image processing module 112 of FIG. 1, according to one or more embodiments. The method 300 starts at step 302 and proceeds to step 304.

At step 304, the method 300 scales the image to a desired thumbnail image size. The method 300 calculates scaling factors for the width and the height. (W,H) represents the width and height, in pixels, of the image. (W1,H1) represents the height and width of the thumbnail rectangle area. The method 300 computes the scaling factors along the height and width as: S1=H/H1 and S2=W/W1. If S1 is equal to S2, the method 300 scales the image using either scaling factor to form the scaled image. In other words, if the aspect ratio of the image is equal to the aspect ratio of the thumbnail rectangular area, the method 300 scales down the image by either scaling factor.

The method 300 resizes the image based on the scale factor between dimensions of the detected image and dimensions of a desired thumbnail image. For example, if the thumbnail size is desired to be 100×50 pixels, a 1200×600 pixel image will be scaled down by a factor of 12 to a size of 100×50 pixels. In some embodiments, if the aspect ratio of the image is equal to the aspect ratio of the thumbnail rectangular area, the method 300 scales down the image and returns the scaled down images as the generated thumbnail. The method 300 proceeds to step 316, and ends. However, if the scale factors are not equal, the method 300 scales the image to an intermediate size in order to reduce processing time when determining a representative area of the image. For example, if an image is 4000×3000 pixels, the image may be reduced to 800×600 pixels.

The method 300 proceeds to step 306, where the method 300 detects if the scaled image includes at least one face. The method 300 performs a face detection algorithm to determine is the image includes at least one face. If the scaled image includes a face, it is assumed that the representative area of the image includes the face. If the scaled image does not include a face, it is assumed that the representative area may be anywhere in the image. The method 300 proceeds to step 308, where the method 300 determines whether a face was found. If a face was found the method 300 proceeds to step 310, where the method 300 identifies an area of importance in the scaled image using face detection, as described in further detail with respect to FIG. 4, below. The method 300 proceeds to step 314.

Figure 4:
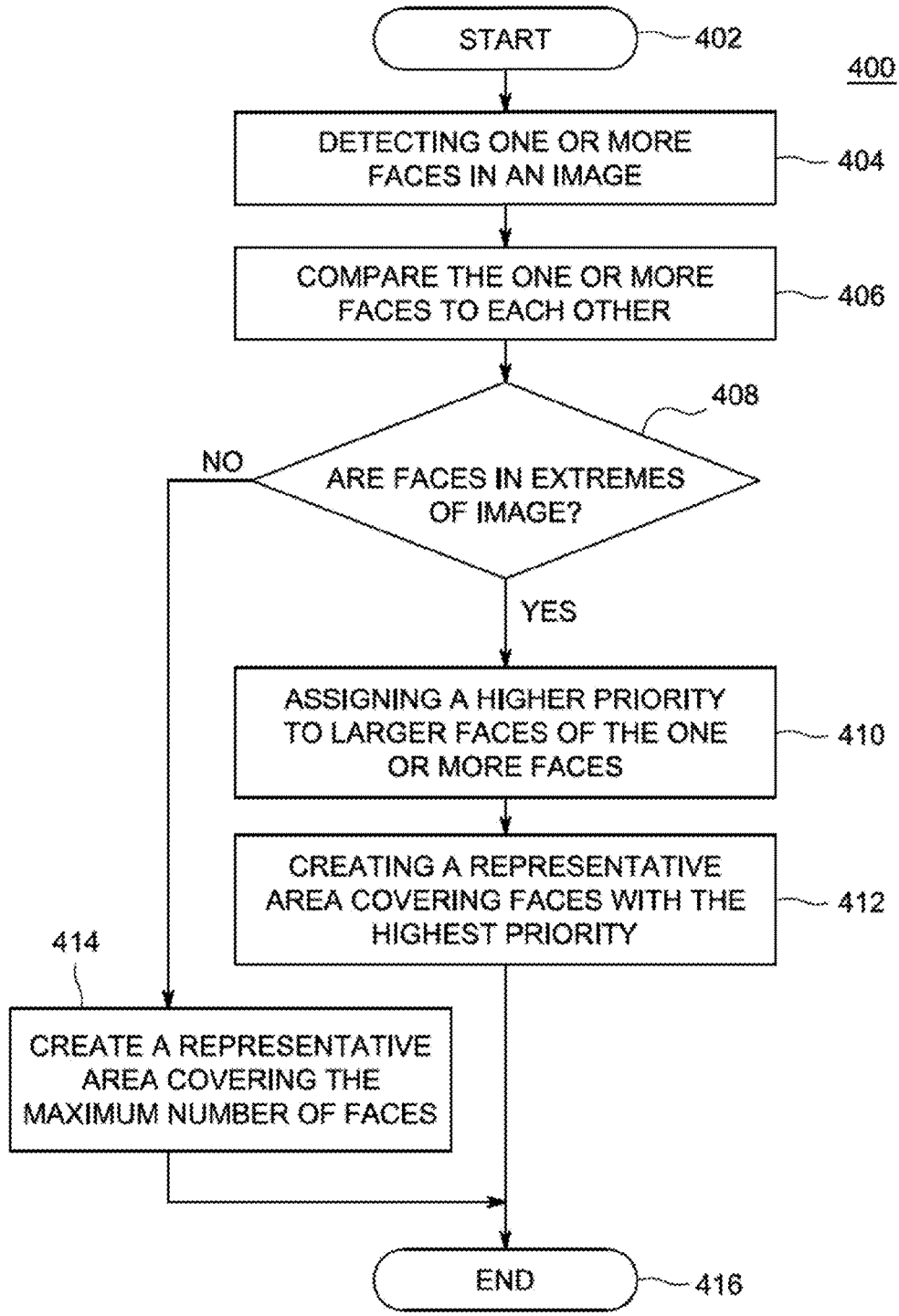
FIG. 4 depicts a flow diagram of a method for identifying faces in an image to generate a representative area of an image as performed by the face detection module of FIG. 1, according to one or more embodiments.

However, if at step 308, the method 300 determines that the scaled image does not include a face, the method 300 proceeds to step 312, where the method 300 identifies an area of importance in the image using edge detection techniques, as described with respect to FIG. 4 below. The method 300 proceeds to step 314.

At step 314, the method 300 generates a thumbnail by cropping the image to the representative area. The method 300 generates a representative area containing the areas of importance. The method 300 crops the scaled image based on the representative area. As in the above example, the scaled image is 800×600 pixels and the method 300 determines that the representative area is a 600×600 pixels portion of the scaled image, starting from the top left of the image. Accordingly, the scaled image is cropped to the 600×600 pixels top-left portion, a thumbnail representing the important portion of the original 4000×3000 pixel image. Now, when this method 200 is applied across a set of images such as a gallery, or in a grid-view, a user is easily able to see all of the images and why those images were taken based on the important portions being shown. The method 300 proceeds to step 316 and ends FIG. 4 depicts a flow diagram of a method 400 for identifying faces in an image to generate a representative area of an image as performed by the face detection module 114 of FIG. 1, according to one or more embodiments. The method begins at step 402 and proceeds to step 404.

At step 404, the method 400 detects one or more faces in an image. The method 400 may utilize any face detection software known in the art. The method 400 may detect one or more faces in the image. The location of the one or more detected faces is marked according to their pixel location and stored for later use.

The method 400 then proceeds to step 406, where the method 400 compares detected faces to each other to determine a priority for each of the one or more faces in order to determine which faces are more "important". For example, the faces may be judged according to size, focus, location, or the like. Those faces which are larger are considered more important than those faces that are smaller. Those faces which are in focus are considered more important than blurred faces.

The method 400 proceeds to step 408. At step 408, the method 400 determines whether the faces are in extremes of the image, i.e., on the left side and the right side, or on the top and on the bottom. If the faces all lie on extremes of the image, the method 400 proceeds to step 410.

At step 410, larger faces are assigned a higher priority than smaller faces from the one or more detected faces and the method 400 proceeds to step 412. At step 412, the method 400 creates a representative area covering faces with the higher priority. In some embodiments, faces with higher priority are faces determined to have a priority greater than a predefined threshold. For example, the area may cover a left side of the image, but not the right side because faces detected at the left side of the image are larger and therefore considered more important than faces detected on the right side. The method terminates at step 416.

However, if at step 408, the method 400 determines that the faces are not in the extremes of the image at step 408, the method proceeds to step 414. At step 414, the method 400 creates a representative area covering the maximum number of faces. The method 400 identifies coordinates for a location in the image, for example, on a top left side of a face on the left. The method 400 then identifies an extent beyond the right side of the faces and an extent to below all of the faces. For example if at step 404, five faces are detected, the representative area is formed as a rectangle large enough to cover the extent that includes all five faces. The method terminates at step 416.

Figure 5:
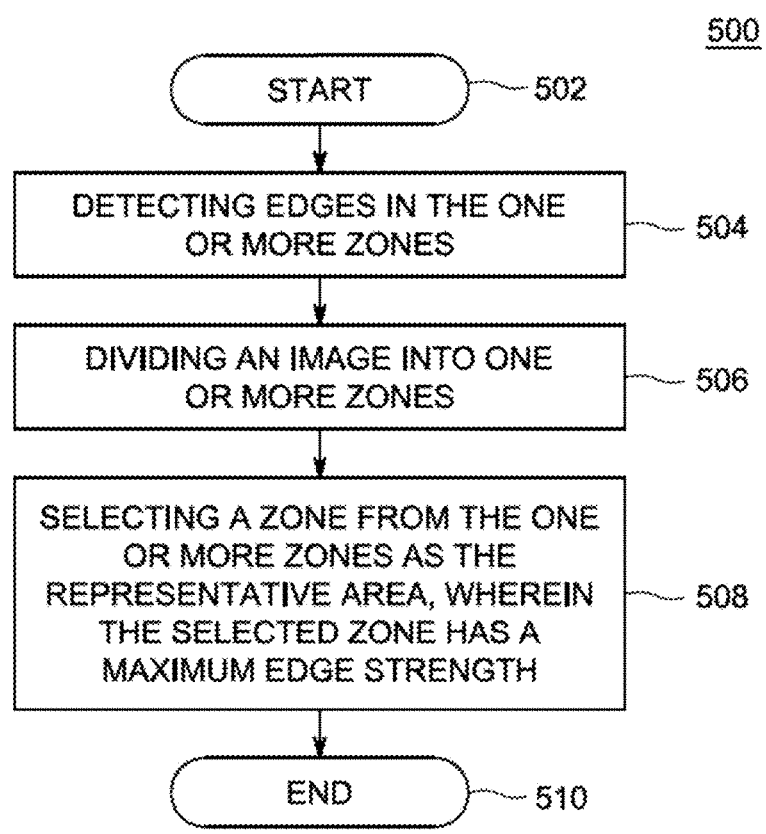
FIG. 5 depicts a flow diagram of a method for generating a representative area in an image with no detected faces as performed by the representative rectangle module of FIG. 1, according to one or more embodiments.

FIG. 5 depicts a flow diagram of a method 500 for generating a representative area in an image with no detected faces as performed by the region detection module 116 of FIG. 1, according to one or more embodiments. The method begins at step 502 and proceeds to step 504.

At step 504, the method 500 detects edges in an image, for example, using a Sobel edge filter or the like. Edge detection algorithms also identify intensity values of each edge. An edge-map is generated showing where edges in the image exist. The existence of an edge is deemed to indicate an area of importance. Optionally, before detecting edges, the image is converted to a gray scale image and the gray scale image is filtered. According to some embodiments, a low-pass filter is applied to the gray scale image.

The method 500 proceeds to step 506. At step 506, the image is divided into one or more zones as described above in reference to FIGS. 1 and 2. According to an exemplary embodiment, (H,W) represents the height and width, in pixels, of the original image. (H1, W1) represent the height and width of the thumbnail rectangle area. The scaling factors along the height and width are computed as: S1=H/H1 and S2=W/W1. If the method 500 determines that S1 is equal to S2, the image is scaled with either scaling factor S1 or S2. The scaled image may be formed into overlapping zones horizontally if S1 is less than S2. Further, the scaled image may be formed into overlapping zones vertically if S1 is greater than S2. Forming the scaled image into zones vertically means dividing the image into a plurality of images where boundary of a zone runs from a top edge of the image to a bottom edge of the image. Similarly, forming the scaled image into zones horizontally means dividing the image into a plurality of images where boundary of a zone runs from a left edge of the image to a right edge of the image.

The method 500 proceeds to step 508. At step 508, a zone is selected from the one or more zones as the representative area, wherein the selected zone has a maximum edge strength. In other words, the zones that include a highest intensity value are determined to identify a representative image. The method terminates at step 510.

Figure 6:
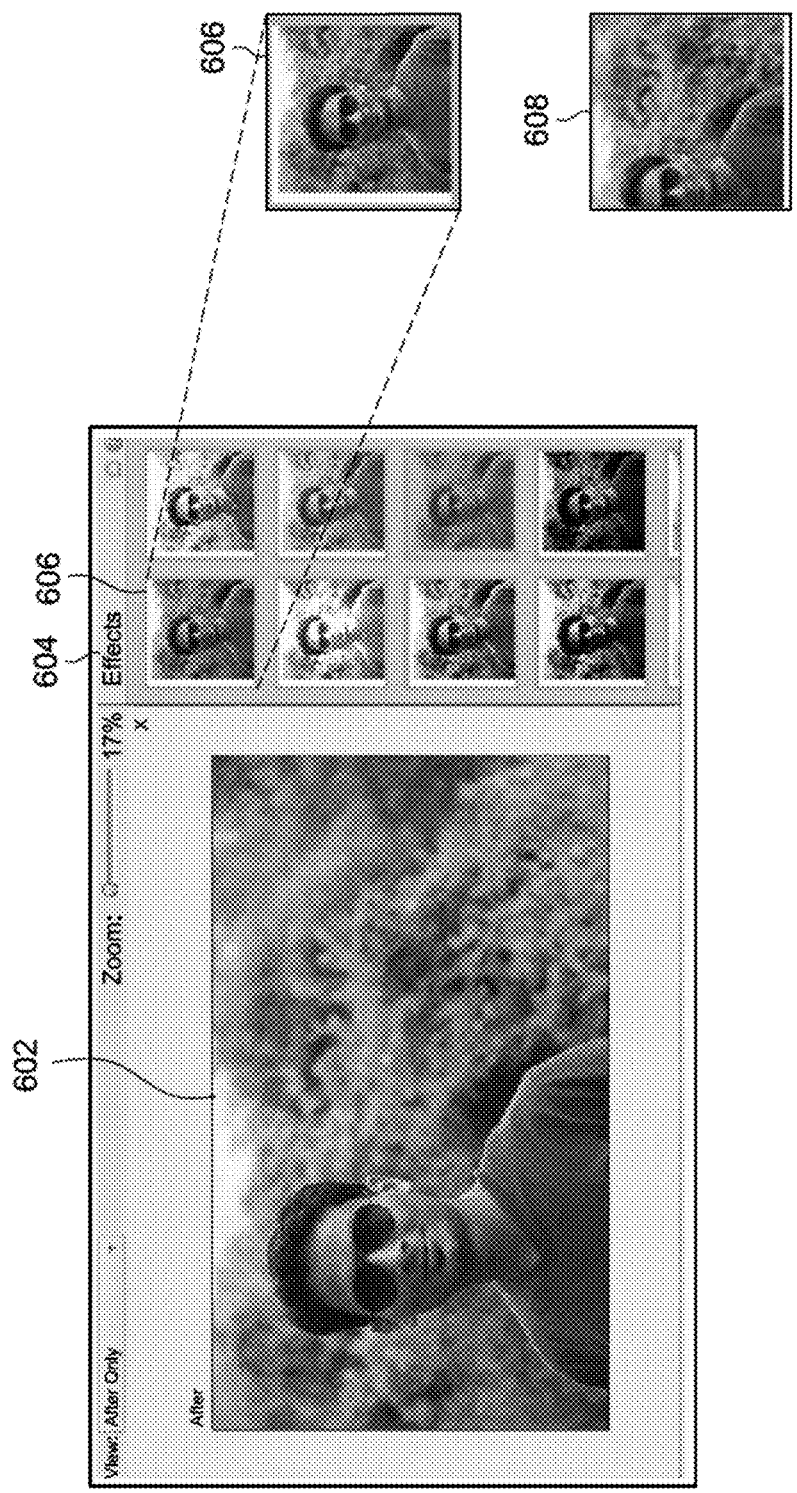
FIG. 6 illustrates an example of an image and its representative thumbnail image, according to one or more embodiments.

FIG. 6 illustrates an example of an image and its representative thumbnail image, according to one or more embodiments. The original photograph 602 may be of a different size than other photographs in a collection or gallery. Alternatively, the photograph may be loaded in a photo alteration application, where the output of one or more "Effects" can be previewed simultaneously. As shown in FIG. 6, the effects side-pane 604 contains various effects such as saturating the image, converting the image to grayscale, focusing the image, and the like. The photograph 602 is previewed as a thumbnail image 606. The image processing module 112 recognized that there was a face in the photograph 602 and created a representative area around the face. The photograph 602 was cropped to the representative area to show the important regions of the photograph, enabling a user of the alteration application to conveniently see how the chosen effect impacts the most important regions of the photograph 602, as opposed to the thumbnail 608. Thumbnail 608 is generated based on a method called center cropping, where a fixed width and length of pixels from the center are selected as the representative portion of the image. The difference between thumbnail 606 and 608 is apparent—the person in thumbnail 608 is cut off, while in thumbnail 606, the person is the primary focal point.

The grid in side-pane 604 represents uniformly generated thumbnails of the photograph 602. In other examples, different photos of different sizes may be represented uniformly in a gallery grid of images. In the photograph 602, if an effect is applied, a user would most likely want to see how the face of the person photographed is impacted. Therefore, the thumbnail generation described above with references to FIGS. 1-4 generates the previews shown in side-pane 604, showing how each effect would impact the user's face. Alternatively, if the photograph 602 contained an image of a boat, for example, the edges of the boat would be detected as described in FIGS. 1 and 5, and the generated thumbnail would show an image of the boat closely cropped, so that the user can see the effect of a particular filter on the important region of the photograph, i.e., the boat.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible.

Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   determining a representative area of an image, the determining comprising:
      scaling the image prior to dividing the image into one or more zones by:
         determining a first scale factor as a height of the image divided by a desired height of a thumbnail image to be generated;
         determining a second scale factor as a width of the image divided by a desired width of the thumbnail image to be generated;
         determining that the first scale factor is not equal to the second scale factor; and
         scaling the image using the first and the second scale factor to produce a scaled image;
      determining an absence of faces in the image;
      dividing the scaled image into one or more zones; and
      selecting a zone with maximum edge strength as the representative area; and
   generating the thumbnail image by cropping the scaled image to the representative area.

2. The method of claim 1, further comprising: generating a plurality of modified thumbnail images by applying a plurality of effects to the generated thumbnail image.

3. The method of claim 2, further comprising: displaying the plurality of modified thumbnail images in a grid.

4. The method of claim 1, wherein determining the representative area of the image further comprises:
   converting the image to a grayscale image;
   applying a filter to produce a smoothed image with reduced noise; and
   detecting edges in the smoothed image to produce an edge-detected image.

5. The method of claim 1, wherein dividing the scaled image comprises:
   determining whether the first scale factor is greater than the second scale factor;
   dividing the scaled image horizontally when the first scale factor is greater than the second scale factor; and
   dividing the scaled image vertically when the second scale factor is greater than the first scale factor.

6. The method of claim 4, further comprising computing a strength of edges for each zone.

7. The method of claim 3, further comprising:
   detecting user selection of at least one of the plurality of modified thumbnail images; and
   applying the effect corresponding to the selected modified thumbnail image to the image to produce a modified image.

8. The method of claim 1, wherein dividing the scaled image into one or more zones further comprises: dividing the scaled image into overlapping zones based on the first scale factor and the second scale factor.

9. A system comprising:
   at least one processor; and
   at least one non-transitory computer readable storage medium storing instructions that, when executed by the at least one processor, cause the system to:
   determine a representative area of an image by:
      scaling the image prior to dividing the image into one or more zones by:
         determining a first scale factor as a height of the image divided by a desired height of a thumbnail image to be generated;
         determining a second scale factor as a width of the image divided by a desired width of the thumbnail image to be generated;
         determining that the first scale factor is not equal to the second scale factor; and
         scaling the image using the first and the second scale factor to produce a scaled image;
      determining an absence of faces in the image;
      dividing the scaled image into one or more zones; and
      selecting a zone with maximum edge strength as the representative area; and
   generate the thumbnail image by cropping the scaled image to the representative area.

10. The system of claim 9, further comprising instructions that, when executed by the at least one processor, cause the system to:
    generate a plurality of modified thumbnail images by applying a plurality of effects to the generated thumbnail image; and
    display the plurality of modified thumbnail images in a grid.

11. The system of claim 9, wherein the instructions, when executed by the at least one processor, cause the system to select the representative area by:
    detecting user selection of at least one of the plurality of modified thumbnail images; and
    applying the effect corresponding to the selected modified thumbnail image to the image to produce a modified image.

12. The system of claim 9, wherein dividing the scaled image comprises:
    determining whether the first scale factor is greater than the second scale factor;
    dividing the scaled image horizontally when the first scale factor is greater than the second scale factor; and
    dividing the scaled image vertically when the second scale factor is greater than the first scale factor.

13. The system of claim 9, wherein dividing the scaled image into one or more zones further comprises: dividing the scaled image into overlapping zones based on the first scale factor and the second scale factor.

14. A non-transitory computer readable medium storing instructions thereon that, when executed by at least one processor, cause a computer system to perform a method comprising:

determining a representative area of an image, wherein determining the representative area of the image comprises:

scaling the image prior to dividing the image into one or more zones by:

determining a first scale factor as a height of the image divided by a desired height of a thumbnail image to be generated;

determining a second scale factor as a width of the image divided by a desired width of the thumbnail image to be generated;

determining that the first scale factor is not equal to the second scale factor; and scaling the image using the first and the second scale factor to produce a scaled image;

determining an absence of faces in the image;

dividing the scaled image into one or more zones; and selecting a zone with maximum edge strength as the representative area; and generating a thumbnail by cropping the scaled image to the representative area.

15. The computer readable medium of claim 14, further comprising instructions that, when executed by the at least one processor cause the system to perform steps comprising: generating a plurality of modified thumbnail images by applying a plurality of effects to the generated thumbnail image.

16. The computer readable medium of claim 15, further comprising instructions that, when executed by the at least one processor cause the system to perform steps comprising: displaying the plurality of modified thumbnail images in a grid.

17. The computer readable medium of claim 14, wherein determining further comprises:

converting the image to a grayscale image;

applying a filter to produce a smoothed image with reduced noise;

detecting edges in the smoothed image to produce an edge-detected image; and computing a strength of edges for each zone in the edge-detected image.

18. The computer readable medium of claim 14, wherein dividing the scaled image comprises:

determining whether the first scale factor is greater than the second scale factor;

dividing the scaled image horizontally when the first scale factor is greater than the second scale factor; and dividing the scaled image vertically when the second scale factor is greater than the first scale factor.

19. The computer readable medium of claim 16, further comprising instructions that, when executed by the at least one processor, cause the computer system to perform steps comprising:

receiving user selection of at least one of the plurality of modified thumbnails; and applying the effect corresponding to the selected modified thumbnail to the image to produce a modified image.

20. The computer readable medium of claim 14, wherein dividing the scaled image into one or more zones further comprises: dividing the scaled image into overlapping zones based on the first scale factor and the second scale factor.

\* \* \* \* \*